United States Patent
Freire et al.

(10) Patent No.: US 6,482,455 B1
(45) Date of Patent: Nov. 19, 2002

(54) NATURAL SOURCE COMPOSITION FOR THE CONTROL OF POST-HARVEST PATHOLOGIES AND METHODS OF APPLICATION

(75) Inventors: Jose Maria Garcia-Mina Freire, Iza (ES); Santiago Cenoz Imaz, Cizur Mayor (ES); Rodrigo Garcia Cabtera, Gorraiz (ES); Angel Ma Zamarreño Arregui, Eugui (ES)

(73) Assignee: Inabonos S.A. (ES)

( * ) Notice: Subject to any disclaimer, the term of this patent is extended or adjusted under 35 U.S.C. 154(b) by 0 days.

(21) Appl. No.: 09/710,755

(22) Filed: Nov. 9, 2000

(30) Foreign Application Priority Data

Nov. 11, 1999 (ES) .................................... 9902472

(51) Int. Cl.$^7$ .............................. A23B 4/20; A23B 7/16
(52) U.S. Cl. ...................... 426/310; 426/99; 426/102; 426/321; 426/333; 426/615; 426/616
(58) Field of Search ................... 426/321, 333, 426/99, 102, 615, 616, 310

(56) References Cited

U.S. PATENT DOCUMENTS

| | | | | |
|---|---|---|---|---|
| 4,978,686 A | * | 12/1990 | Sotome | 514/698 |
| 5,639,794 A | * | 6/1997 | Emerson et al. | 514/699 |
| 5,741,699 A | * | 4/1998 | Wilson et al. | 435/255 |

* cited by examiner

Primary Examiner—Helen Pratt
(74) Attorney, Agent, or Firm—Foley & Lardner

(57) ABSTRACT

The composition contains a fundamental active ingredient consisting of the association of thymol, eugenol and cinnamaldehyde, a secondary active ingredient consisting of the association of cuminaldehyde, geraniol, vanillin, borneol, menthol, anethole, terpineol, limonene and different glycosides contained in the essences of mustard and jasmine, a surface-active selected among the different families accepted as emulsifying food additives and an oligosaccharide selected among the mono-oligosaccharides, fructo-oligosaccharides, phyco-oligosaccharides proceeding from algae extracts or vegetable tissue. The composition that has just been described is applied to fruit and vegetables in a diluted bath or in solid form incorporated into the waxes that are usually used in post-harvest treatments.

20 Claims, No Drawings

NATURAL SOURCE COMPOSITION FOR THE CONTROL OF POST-HARVEST PATHOLOGIES AND METHODS OF APPLICATION

The present invention consists of a composition for the control of post-harvest pathologies of fruits and vegetables, specifically the attack of pathogens and the phenomenons of chemical degeneration of the skin, with the particularity that its application is compatible with human or animal consumption.

Within the process of preservation of fruits and vegetables the two most important problems that arise are:

The attack of pathogenic agents, mainly specific types of funguses and bacterias.

The process of chemical degeneration of the skin, which is defined in two fundamental phenomenons: scalding of the skin—bruising—(mainly apples and pears), which seems to be linked with determined oxidation processes (the generation of highly reactive free radicals), and oleocellosis (citrics).

Actually, both processes—included among what we may call post-harvest pathology—are partly related in spite of the differences that exist in the mechanisms that generate them.

In effect, it is known that the processes of pathogenic attack generates a local response in the vegetable tissue related to the natural defense mechanism, which includes the synthesis of highly reactive oxygenated species ($H_2O_2$, $*O_2$ and $*OH$) which may produce cellular death by means of self-oxidation processes. In this context, it is very probable that the oxidation of substances in the area of the skin may be produced—such as a-farnesene in the case of scalding—which will aid the scalding processes, as well as the processes of oleocellosis as a response to the generation of toxic substances (Bondoux, P., "Diseases in the preservation of fruits and vegetables." INRA, Mundi Prensa, 1994; Snowdon, A., "Post-harvest. Diseases & Disorders of fruits and vegetables." Wolfe Scientific, 1990; Tuset, J. J., "Citric rotting," Generalitat Valenciana, 1987.) For this reason we consider it fundamental to address the solving of post-harvest pathology in an integrated way, so that the two general problems may be handled simultaneously and coordinately: the affliction of pathogens and the chemical degeneration of the skin.

Presently synthesis products have been developed that are efficient against both problems—thiobendazols, benomyl or orthophenylphenol for the control of funguses and other pathogens; and phenylamine or ethoxyquin for the control of scalding—which however present many toxicity problems for human health, both related to the consumption of the treated products as well as in their application to the fruit or vegetable. Likewise, none of them simultaneously and coordinately solves the two problems included in post-harvest pathology.

Due to all of this, the development of eco-compatible products, without any type of:

Phytotoxicity or decreasing effect in the quality—taste, smell, color, texture—at efficient doses.

Risk for human health, both in immediate consumption of the treated product as well as in the process of application of the product.

With the capacity of controlling coordinately and in a simultaneous way the problems of pathogenic agent attacks and the problems of chemical degeneration of the skin—scalding and oleocellosis—they undoubtedly are of interest and they constitute a presently unresolved aspect. As we will see next, this is the object of the present invention.

Presently, non-toxic natural source compositions have been developed—derived fundamentally from essential oils of vegetable source accepted for the direct use in human nutrition as an additive—with the capacity of controlling the attack of funguses in producing plants, however these compositions are not valid for the overall control of post-harvest pathology for two fundamental reasons:

The described doses and their method of application reveal phytotoxicity in citrics due to the development of an oleocellosis process that generates bruising (processes of oxidation-generation of highly reactive free radicals). In fact, the majority of these patents describe the use of the product in producing plants either in foliar application or in radicular application, but not in post-harvest application.

They do not have the capacity of controlling the processes of chemical degeneration of the skin. None of these patents describes an action of the product against the problems of scalding or oleocellosis.

Thus, the French patent FR 2529755 (Sotome, 1982) describes the use of cinnamic aldehyde (cinnamaldehyde), a major component of cinnamon essence, as an agent for the control of pathogenic funguses both in producing plants—foliar or radicular use—as well as in the post-harvest processes. However, as shown in table 1, the direct application of the product according to the composition and dose described by the author, possesses a high level of phytotoxicity in citrics, by unleashing an oleocellosis process in the skin.

TABLE 1

Intensity and frequency of the phytotoxicity derived from the application of cinnamic aldehyde (cinnamaldehyde) and the association of cinnamic aldehyde-eugenol in oranges (Valencia late).
(Time of application: 60 seconds. No. of fruits: three repetitions of three fruits. Temperature 20° C. Method: immersion bath.)
Frequency % of affected fruit.
Intensity % of surface of affected skin.

| Treatment | Frequency | Intensity |
| --- | --- | --- |
| 20% Cinnamaldehyde | 100 | 90 |
| 15% Cinnamaldehyde, 15% Eugenol | 100 | 90 |

On the other hand, the described composition does not have any effect on the control of the scalding or oleocellosis processes, and in this last case it even provokes it.

Maybe these results led this same author to a later patent with a similar content. The document of American U.S. Pat. No. 4,978,686 (Sotome, 1987) describes a composition consisting of the association of a cinnamaldehyde and an antioxidant, but only for use in growing plants—foliar or radicular application—and not for post-harvest use. Likewise, it does not describe any anti-scalding use or effect or the control of oleocellosis in citrics. In effect, the introduction of the antioxidant is only to inhibit the oxidation of the cinnamic aldehyde in the means. The introduction of the antioxidant is not directed toward an action on the plant.

On the other hand, the inclusion of a surface-active is aimed only at facilitating the dispersion of the product in water. In fact, the products advised by this author are not admitted as additives for use in food (Pluronic L-64 and Pluronic P-102).

Beilfuss et al, in the Canadian patent document CA 2,012,288 describe a composition consisting of a phenol (including thymol, eugenol, carvacrol), an alcohol (e.g. of the phenoxy-ethanol group) and a surface-active (not described). With a disinfectant effect on the plant (foliar and ground application) and of surfaces and rooms. He does not describe its use on fruit and vegetables in post-harvest application. Likewise, he does not describe any anti-scalding effect or of oleocellosis control in citrics.

Other patent documents are known which contain some essential oil, but their application is focused on an insecticide, nematicide, fungicide or bactericide action, always on producing plants (foliar or ground application), but not for post-harvest use. Likewise they do not describe any anti-scaldant effect or of oleocellosis control in citrics.

Specifically, and as indicated previously, the object of the present invention is to obtain a composition which, when applied as described, allows:

The application of a non-toxic, eco-compatible product and valid related with human nutrition, of specific post-harvest use for the control of the disorders associated with this situation: post-harvest pathology.

To control simultaneously and in a coordinated manner the combination of fundamental problems associated with the denominated post-harvest pathology; the affliction by pathogenic agents and the phenomenons of chemical degeneration of the skin (scalding, oleocellosis).

In summary, the object of the present invention is a new composition that:

is eco-compatible does not have any risk for human health related both to the consumption of the products treated with it, as well as with the user in the application process.

With the capacity of simultaneously controlling the fundamental post-harvest disorders (post-harvest pathology):

Affliction of pathogenic agents: mainly funguses, insects, bacterias and nematodes.

Processes of chemical degeneration of the skin: scalding and oleocellosis.

Consisting mainly of:

The association thymol-eugenol or cinnamaldehyde-eugenol or thymol-cinnamaldehyde-eugenol (or of the essences that contain them such as Thyme (thymol), clover (eugenol), and cinnamon (cinnamaldehyde); or analogous products, structural of each one of them (these main associations can also be associated with the following secondary active ingredients: cuminaldehyde and/or geraniol and/or vanillin and/or borneol and/or menthol and/or anethole and/or terpineol and/or limonene and/or different glycosides contained in the essences of mustard or jasmine; or/and to the vegetable essences that contain them.

A surface-active among the different families accepted as emulsifying food additives such as lecithin, ammonium phosphatides, fatty acid esters, polysorbates, sucrose esters and saccharose esters and fatty acids and polyglycerides. Preferably sorbitans and polysorbates (Twens and Span families).

Determined oligosaccharides: mono-oligosaccharides; fructo-oligosaccharides; phyco-oligosaccharides proceeding from algae extracts (e.g. ascophyllum nodosum) and phyto-oligosaccharides proceeding from any vegetable tissue.

And a method of application consisting in that these compositions are used by means of a bath (drencher, shower or immersion) of the product to be treated respecting the following parameters:

Dose: between 1–10000 ppm in the application solution.

Temperature: between 50–80° C.

Time: between 1 second and 10 minutes.

The objects pursued by the composition object of this invention are reached by means of the following mechanisms:

Control of the Affliction of Pathogens

Combined action of the main active ingredients thymol-eugenol; cinnamaldehyde-eugenol and thymol-eugenol-cinnamaldehyde (or structurally analogous to these) (we will call them EOI, meaning: Essential Oil Ingredient), formulated together or in the presence of other secondary active ingredients contained in other essential oils (see the summarized description of the invention) and determined oligosaccharides (OLS).

The EOI's would act by means of a direct pesticide action against the pathogen. The OLS's do not posses a direct action, rather an indirect one by means of the activation of the defense system of the plants.

The combined action of the two families of active ingredients allow to effectively inhibit the growth of the pathogenic agents, allowing a sufficiently reduced dosing of the EOI's so that the phenomenon of phytotoxicity described for other non-viable compositions (Beilfuss, Sotonie) does not appear.

This strengthened action with phytotoxicity elimination, is favored by the method of application: a combination of the temperature of the bath and a reduced contact time of the fruit with the product.

In this case the surface-active agent is not fundamental, with its purpose being—on the other hand, important—the dispersion of the product in the aqueous means.

Inhibition of the Phenomenons of Chemical Degeneration of the Skin

This action takes place by means of two complementary mechanisms:

1. The elimination or reduction of the affliction caused by pathogenic agents limits the endogenous production of reactive oxygenated species ($H_2O_2$, $^*O_2$ and $^*OH$), reducing the risks of oxidation of compounds present in the skin.
2. The combined presence of the specific thymol-eugenol-surface-active agent contributes toward creating a reducing atmosphere in the means, which allows the control of the authorization phenomenons.

In this second mechanism the combined presence of the three ingredients is found to be important to obtain a significant effect.

Specifically, the action of the selected surface-active agent is especially of interest, a type of Twen or Span (polysorbates or sorbitan esters; all of them valid for nutritional use); with Polysorbate 80 (Twen 80) proving to be especially efficient, and Span 80 at a concentration in the formula of 30% over the total composition. The presence of the surface-active strengthens the control effect of the processes of chemical degeneration of the skin by improving the penetration and permanence of the active ingredients (thymol-eugenol).

For this action, the effect of the temperature or the time of exposure is not found to be so determinant.

In a preferred embodiment of the invention the method of operation is as follows:

Preparation of 1 kg of Product:

Ingredients:

1. 300 g of thymol
2. 200 g of cinnamaldehyde
3. 120 g of eugenol 4. 50 g of cuminaldehyde
5. 30 g of mono-oligosaccharides
6. 300 g of Twen 80

Manufacturing Method
1. Introduce ingredients 1, 2, 3, 4 and 6 into a reactor with a blade mixer. Mix during 60 minutes at room temperature (20° C.). It is not good for the temperature to be above 30° C. to avoid the volatilization of the active ingredients 1, 2, 3, and 4.
2. Add compound 5. Mix the combination during 60 minutes.

Application Method
In a bath, diluted
Concentration: 200 to 1000 ppm
Temperature: 45 to 50° C.
Time: 50 seconds Alternatively the composition may be applied desiccated, in solid form, incorporated into the waxes that are used in post-harvest treatments.

Following, some field tests have been compiled. These tests were performed in real application conditions to contrast the efficiency of the composition and the method of application object of the present invention.

1. Disease Control Test
The product used was of the following type:
(Formula 1)
Thymol: 20%
Eugenol: 15%
Cinnamaldehyde: 15%
Surface-active complex (Twen 80 type): 20%
Mono-oligosaccharides: 5%
Water: 25%
Its denomination is Formula 1

Test conditions:
Varieties: Pears, Abate and Conferencia
Method of treatment: immersion
Duration of the treatment: 60 seconds
Type of preservation: refrigerator (Abate) and rolled atmosphere (Conferencia)
Period of drying before refrigerating: 3 hours in open air.
Treatments:

| N | Treatment | Composition | Dose (1/m³) |
|---|---|---|---|
| 1 | Control | Drinking water | — |
| 2 | Conventional | DPA* + TBZ* | 2 + 1.2 |
| 3 | Formula 1 | Composition-invention | 10 |

*DPA: Diphenylamine // TBZ: Thiobendazol

Sampling: at 108 days.
Results:

Abate Pear

| Treatm. | Total fruits | Healthy fruit | Pathogenic fruit | % pathogenic fruit | Scalded |
|---|---|---|---|---|---|
| 1 | 96 | 91 | 5 | 5.2 | 0 |
| 2 | 96 | 93 | 3 | 3.1 | 0 |
| 3 | 96 | 96 | 0 | 0 | 0 |

-continued

Conferencia Pear

| Treatm. | Total fruits | Healthy fruit | Pathogenic fruit | % pathogenic fruit | Scalded | Fruit with phyto-toxicity | % fruit with phyto-toxicity |
|---|---|---|---|---|---|---|---|
| 1 | 90 | 85 | 5 | 5.6 | 0 | 0 | 0 |
| 2 | 90 | 87 | 3 | 3.3 | 0 | 2 | 2.2 |
| 3 | 90 | 90 | 0 | 0 | 0 | 0 | 0 |

As can be seen, the formula object of this invention presented an efficiency equal to or—even—higher than the synthesis treatment of reference, which included thiabendazol as an antifungus agent and diphenylamine as an antiscalding agent.

In these tests the anti-scalding effect could not be evaluated because the problem did not occur. However, in the conference pear, the phytotoxic effect can be observed of the conventional treatment which is not observed in our case.

2. Test of Diseases and Scalding Control
Products tested object of the invention.
Formula 1 (formula object of the invention indicated in the previous section.)
Formula 2 (formula object of the invention in which the antioxidant power of the compound thymol-eugenol-surface-active (Twen 80 type) is increased):
Thymol: 20%
Eugenol: 15%
Cinnamaldehyde: 15%
Surface-active complex (Twen 80 type): 35%
Mono-oligosaccharides: 5%
Water: 10%
Variety: Granny Smith apple
Method of treatment: immersion
Duration of the treatment: 60 seconds
Type of preservation: regular refrigerator (−0.3 to −0.5° C.)
Period of drying before refrigerating: 3 hours in open air.

| N | Treatment | Composition | Dose (1/m³) |
|---|---|---|---|
| 1 | Witness | As collected | — |
| 2 | Conventional | DPA* + TBZ* | 6 + 1.5 |
| 3 | Formula 1 | F. invention | 10 |
| 4 | Formula 2 | F. invention | 10 |

Sampling: at 115 days.
Results

| Treatment | Total fruits | Disease | Scalding |
|---|---|---|---|
| 1 | 128 | 1 | 44 |
| 2 | 115 | 0 | 50 |
| 3 | 137 | 0 | 37 |
| 4 | 133 | 0 | 6 |

*DPA: Diphenylamine // TBZ: Thiobendazol

Even though this type of apple did not present high levels of attack, the obtained results regarding the scalding are very interesting. As can be seen, formula 1 presented a significant reduction of the number of scalded fruits both with regard to the control as well as with the treatment with the synthesis product (diphenylamine).

On the other hand, it is observed that the strengthening of the system thymol-eugenol-surface-active complex significantly improves the capacity of controlling the scalding while maintaining the capacity of controlling the disease.

What is claimed is:

1. A composition comprising:
   (a) eugenol, one or both of thymol and cinnamaldehyde; and
   (b) an oligosaccharide, wherein the eugenol, the one or both of thymol and cinnamaldehyde and the oligosaccharide are present in the composition in an amount sufficient to inhibit the growth of pathogen and control chemical degeneration of the surface of a fruit or vegetable.

2. The composition of claim 1 further comprising:
   (c) one or more of cuminaldehyde, geraniol, vanillin, borneol, menthol, anethol, terpineol, limonene, glycosides contained in the essence of mustard and glycosides contained in the essence of jasmine.

3. The composition of claim 1 further comprising:
   (c) a surface active agent.

4. The composition of claim 3, wherein the surface active agent is selected from the group consisting of sorbitan esters, polysorbates, lecithin, ammonium phosphatides, fatty acid esters, sucrose esters, saccharose esters, fatty acids and polyglycerides.

5. The composition of claim 1 further comprising:
   (c) a harvested fruit or vegetable, wherein the eugenol, one or both of the thymol and cinnamaldehyde and the oligosaccharide are present on the skin of the fruit or vegetable.

6. The composition of claim 5 comprising thymol.

7. The composition of claim 5 comprising both thymol and cinnamaldehyde.

8. The composition of claim 5 wherein the oligosaccharide is selected from the group consisting of mono-oligosaccharides, fructo-oligosaccharides, phyco-oligosaccharides and phyto-oligosaccharides.

9. The composition of claim 2 wherein the composition consists essentially of:
   (a) eugenol and one or both of thymol and cinnamaldehyde;
   (b) an oligosaccharide;
   (c) optionally one or more of cuminaldehyde, geraniol, vanillin, borneol, menthol, anethol, terpineol, limonene, glycosides contained in the essence of mustard and glycosides contained in the essence of jasmine;
   (d) optionally a surface active agent;
   (e) optionally water; and
   (f) optionally a wax.

10. The composition of claim 9 wherein the non-water and non-wax components of the components consist essentially of:
    (i) 50 to 70 percent of the composition by weight (a);
    (ii) 1 to 5 percent of the composition by weight (b);
    (iii) 5 to percent of the composition by weight (c); and
    (iv) 10 to 30 percent of the composition by weight (d).

11. A method for protecting a harvested fruit or vegetable, comprising applying a composition comprising eugenol, one or both of thymol and cinnamaldehyde and an oligosaccharide to the surface of a harvested fruit or vegetable, wherein the composition effectively inhibits growth of pathogenic agents on the surface of the fruit or vegetable and controls chemical degeneration of the surface of the fruit or vegetable.

12. The method of claim 11 wherein the composition further comprises a surface active agent.

13. The method of claim 2 wherein the composition is dispersed in an aqueous medium and applied to the surface of the harvested fruit via the aqueous medium.

14. The method of claim 13 wherein the composition comprises 1 to 10,000 parts per million of the aqueous medium.

15. The method of claim 14 wherein the comprises 200 to 1000 parts per million of the aqueous medium.

16. The method of claim 11 wherein the composition is applied to the surface of the harvested fruit or vegetable as an edible wax.

17. The method of claim 11 wherein the composition further comprises one or more of cuminaldehyde, geraniol, vanillin, borneol, menthol, anethol, terpineol, limonene, glycosides contained in the essence of mustard and glycosides contained in the essence of jasmine.

18. The method of claim 11 wherein the composition comprises:
    (a) 50 to 70 percent of the composition by weight of the combination of eugenol and one or more of thymol and cinnamaldehyde;
    (b) 5 to 20% of the composition by weight of one or more of cuminaldehyde, geraniol, vanillin, borneol, menthol, anethol, terpineol, limonene, glycosides contained in the essence of mustard and glycosides contained in the essence of jasmine;
    (c) 10 to 30% of the composition by weight of a surface active agent; and
    (d) 1 to 5% of the composition by weight of the oligosaccharides.

19. The method of claim 11 wherein the temperature at which the fruit or vegetable is contacted with the composition is from 5 to 80° centigrade.

20. A fruit or vegetable protected by the method of claim 11.

* * * * *

UNITED STATES PATENT AND TRADEMARK OFFICE
CERTIFICATE OF CORRECTION

PATENT NO.      : 6,482,455 B1
DATED           : November 19, 2002
INVENTOR(S)     : Freire et al.

It is certified that error appears in the above-identified patent and that said Letters Patent is hereby corrected as shown below:

Column 4,
Line 18, "posses" should be -- possess --.
Line 25, "Sotonie" should be -- Sotome --.

Column 5,
Line 38, "rolled" should be -- controlled --.

Column 8,
Line 6, "5 to percent" should be -- 5 to 20 percent --.
Line 18, "claim 2" should be -- claim 12 --.
Line 24, "the comprises 200" should be -- the composition comprises 200 --.

Signed and Sealed this

Twenty-third Day of September, 2003

JAMES E. ROGAN
*Director of the United States Patent and Trademark Office*